US006934951B2

(12) United States Patent
Wilkinson, III et al.

(10) Patent No.: US 6,934,951 B2
(45) Date of Patent: Aug. 23, 2005

(54) PARALLEL PROCESSOR WITH FUNCTIONAL PIPELINE PROVIDING PROGRAMMING ENGINES BY SUPPORTING MULTIPLE CONTEXTS AND CRITICAL SECTION

(75) Inventors: Hugh M. Wilkinson, III, Newton, MA (US); Matthew J. Adiletta, Worcester, MA (US); Gilbert Wolrich, Framingham, MA (US); Mark B. Rosenbluth, Uxbridge, MA (US); Debra Bernstein, Sudbury, MA (US); Myles J. Wilde, Charlestown, MA (US)

(73) Assignee: Intel Corporation, Santa Clara, CA (US)

(*) Notice: Subject to any disclaimer, the term of this patent is extended or adjusted under 35 U.S.C. 154(b) by 573 days.

(21) Appl. No.: 10/053,172

(22) Filed: Jan. 17, 2002

(65) Prior Publication Data

US 2003/0135351 A1 Jul. 17, 2003

(51) Int. Cl.[7] .................................................. G06F 9/46
(52) U.S. Cl. ......................... 718/107; 712/28; 712/228; 718/104
(58) Field of Search ................... 712/28, 228; 718/104, 718/107

(56) References Cited

U.S. PATENT DOCUMENTS

| 3,373,408 A | 3/1968 | Ling ........................... 712/228 |
| 3,478,322 A | 11/1969 | Evans ......................... 712/248 |
| 3,792,441 A | 2/1974 | Wymore et al. ............. 712/248 |
| 3,940,745 A | 2/1976 | Sajeva ......................... 710/244 |
| 4,130,890 A | 12/1978 | Adam ........................ 365/184 |

(Continued)

FOREIGN PATENT DOCUMENTS

| EP | 0 379 709 | 8/1990 |
| EP | 0 464 715 | 1/1992 |
| EP | 0 633 678 | 1/1995 |
| EP | 0 745 933 | 12/1996 |
| EP | 0 809 180 | 11/1997 |
| EP | 1 148 414 | 10/2001 |
| JP | 59111533 | 6/1984 |
| WO | WO 94/15287 | 7/1994 |
| WO | WO 97/38372 | 10/1997 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 01/95101 | 12/2001 |

OTHER PUBLICATIONS

U.S. Appl. No. 10/726,757, filed Dec. 3, 2003, Wolrich et al.
U.S. Appl. No. 10/684,078, filed Oct. 10, 2003, Wolrich et al.
U.S. Appl. No. 10/664,202, filed Sep. 16, 2003, Wolrich et al.
U.S. Appl. No. 10/644,337, filed Aug. 20, 2003, Wolrich et al.

(Continued)

Primary Examiner—Kenneth S. Kim
(74) Attorney, Agent, or Firm—Fish & Richardson P.C.

(57) ABSTRACT

A system and method for employing multiple hardware contexts and programming engines in a functional pipeline partitioned to facilitate high performance data processing. The system and method includes a parallel processor that assigns system functions for processing data including programming engines that support multiple contexts arranged to provide a functional pipeline by a functional pipeline control unit that passes functional data among the programming engines.

25 Claims, 5 Drawing Sheets

U.S. PATENT DOCUMENTS

| | | |
|---|---|---|
| 4,400,770 A | 8/1983 | Chan et al. .................... 711/3 |
| 4,514,807 A | 4/1985 | Nogi ........................... 712/21 |
| 4,523,272 A | 6/1985 | Fukunaga et al. .......... 710/107 |
| 4,745,544 A | 5/1988 | Renner et al. ................ 712/11 |
| 4,866,664 A | 9/1989 | Burkhardt, Jr. et al. ..... 709/227 |
| 5,140,685 A | 8/1992 | Sipple et al. ............... 711/164 |
| 5,142,683 A | 8/1992 | Burkhardt, Jr. et al. ..... 709/215 |
| 5,155,831 A | 10/1992 | Emma et al. ............... 711/121 |
| 5,155,854 A | 10/1992 | Flynn et al. ................ 718/104 |
| 5,168,555 A | 12/1992 | Byers et al. .................. 713/2 |
| 5,173,897 A | 12/1992 | Schrodi et al. ............. 370/394 |
| 5,255,239 A | 10/1993 | Taborn et al. .............. 365/221 |
| 5,263,169 A | 11/1993 | Genusov et al. ............... 712/7 |
| 5,347,648 A | 9/1994 | Stamm et al. ................. 714/5 |
| 5,367,678 A | 11/1994 | Lee et al. ................... 718/104 |
| 5,390,329 A | 2/1995 | Gaertner et al. ............ 718/108 |
| 5,392,391 A | 2/1995 | Caulk, Jr. et al. ........... 345/503 |
| 5,392,411 A | 2/1995 | Ozaki ........................... 711/1 |
| 5,392,412 A | 2/1995 | McKenna .................... 710/52 |
| 5,404,464 A | 4/1995 | Bennett ....................... 710/306 |
| 5,404,482 A | 4/1995 | Stamm et al. ............... 711/145 |
| 5,432,918 A | 7/1995 | Stamm ........................ 711/156 |
| 5,448,702 A | 9/1995 | Garcia, Jr. et al. .......... 710/100 |
| 5,450,351 A | 9/1995 | Heddes ........................ 365/49 |
| 5,452,437 A | 9/1995 | Richey et al. ................. 714/4 |
| 5,459,842 A | 10/1995 | Begun et al. ............... 711/155 |
| 5,463,625 A | 10/1995 | Yasrebi ....................... 370/401 |
| 5,467,452 A | 11/1995 | Blum et al. ................. 709/244 |
| 5,517,648 A | 5/1996 | Bertone et al. ............. 710/244 |
| 5,542,070 A | 7/1996 | LeBlanc et al. .............. 703/20 |
| 5,542,088 A | 7/1996 | Jennings, Jr. et al. ....... 718/103 |
| 5,544,236 A | 8/1996 | Andruska et al. ....... 379/201.02 |
| 5,550,816 A | 8/1996 | Hardwick et al. .......... 370/397 |
| 5,557,766 A | 9/1996 | Takiguchi et al. ............. 711/5 |
| 5,568,617 A | 10/1996 | Kametani .................... 710/100 |
| 5,574,922 A | 11/1996 | James ......................... 712/220 |
| 5,592,622 A | 1/1997 | Isfeld et al. ................. 709/207 |
| 5,613,071 A | 3/1997 | Rankin et al. ................ 707/10 |
| 5,613,136 A | 3/1997 | Casavant et al. ............. 712/28 |
| 5,623,489 A | 4/1997 | Cotton et al. ............... 370/381 |
| 5,627,829 A | 5/1997 | Gleeson et al. ............. 370/230 |
| 5,630,130 A | 5/1997 | Perotto et al. .............. 718/107 |
| 5,644,623 A | 7/1997 | Gutledge .................... 455/423 |
| 5,649,157 A | 7/1997 | Williams .................... 711/151 |
| 5,659,687 A | 8/1997 | Kim et al. ................... 710/112 |
| 5,680,641 A | 10/1997 | Sidman ........................ 710/20 |
| 5,689,566 A | 11/1997 | Nguyen ....................... 713/155 |
| 5,689,722 A * | 11/1997 | Swarztrauber ............... 712/12 |
| 5,699,537 A | 12/1997 | Sharangpani et al. ....... 712/217 |
| 5,717,898 A | 2/1998 | Kagan et al. ............... 711/145 |
| 5,721,870 A | 2/1998 | Matsumoto ................. 711/152 |
| 5,742,587 A | 4/1998 | Zornig et al. ............... 370/235 |
| 5,742,782 A | 4/1998 | Ito et al. ..................... 712/210 |
| 5,742,822 A | 4/1998 | Motomura .................. 718/102 |
| 5,745,913 A | 4/1998 | Pattin et al. ................ 711/105 |
| 5,751,987 A | 5/1998 | Mahant-Shetti et al. ........ 711/5 |
| 5,761,507 A | 6/1998 | Govett ........................ 718/104 |
| 5,761,522 A | 6/1998 | Hisanga et al. ................ 712/1 |
| 5,781,774 A | 7/1998 | Krick ........................... 713/1 |
| 5,784,649 A | 7/1998 | Begur et al. ................. 710/52 |
| 5,784,712 A | 7/1998 | Byers et al. ................. 712/219 |
| 5,796,413 A | 8/1998 | Shipp et al. ................. 345/522 |
| 5,797,043 A | 8/1998 | Lewis et al. ................. 710/56 |
| 5,809,235 A | 9/1998 | Sharma et al. .............. 709/230 |
| 5,809,530 A | 9/1998 | Samra et al. ................ 711/140 |
| 5,812,868 A | 9/1998 | Moyer et al. ................. 712/23 |
| 5,828,746 A | 10/1998 | Ardon ........................ 379/230 |
| 5,828,863 A | 10/1998 | Barrett et al. ................ 703/24 |
| 5,832,215 A | 11/1998 | Kato et al. .................. 709/230 |
| 5,835,755 A | 11/1998 | Stellwagen, Jr. .............. 707/3 |
| 5,854,922 A | 12/1998 | Gravenstein et al. ........ 712/245 |
| 5,860,158 A | 1/1999 | Pai et al. ..................... 711/118 |
| 5,886,992 A | 3/1999 | Raatikaien et al. .......... 370/410 |
| 5,887,134 A | 3/1999 | Ebrahim ..................... 709/200 |
| 5,890,208 A | 3/1999 | Kwon ......................... 711/112 |
| 5,892,979 A | 4/1999 | Shiraki et al. ................. 710/52 |
| 5,905,876 A | 5/1999 | Pawlowski et al. ......... 710/112 |
| 5,905,889 A | 5/1999 | Wilhelm, Jr. ............... 718/104 |
| 5,913,059 A | 6/1999 | Torii ........................... 718/104 |
| 5,915,123 A | 6/1999 | Mirsky et al. ................. 712/16 |
| 5,935,983 A | 8/1999 | Muller et al. ............... 709/243 |
| 5,937,187 A | 8/1999 | Kosche et al. .............. 718/104 |
| 5,940,612 A | 8/1999 | Brady et al. ................. 718/103 |
| 5,940,866 A | 8/1999 | Chisholm et al. ........... 711/170 |
| 5,946,487 A | 8/1999 | Dangelo ...................... 717/148 |
| 5,948,081 A | 9/1999 | Foster ........................... 710/40 |
| 5,958,031 A | 9/1999 | Kim ............................ 710/310 |
| 5,961,628 A | 10/1999 | Nguyen et al. ................. 712/2 |
| 5,970,013 A | 10/1999 | Fischer et al. .......... 365/230.01 |
| 5,978,838 A | 11/1999 | Mohammed et al. ........ 709/208 |
| 5,983,274 A | 11/1999 | Hyder et al. ................. 709/230 |
| 6,012,151 A | 1/2000 | Mano ........................... 714/11 |
| 6,014,729 A | 1/2000 | Lannan et al. ............... 711/150 |
| 6,023,742 A | 2/2000 | Ebeling et al. .............. 710/107 |
| 6,058,168 A | 5/2000 | Braband .................... 379/93.24 |
| 6,067,585 A | 5/2000 | Hoang .......................... 710/11 |
| 6,070,231 A | 5/2000 | Ottinger ...................... 711/141 |
| 6,072,781 A | 6/2000 | Feeney et al. ............... 370/282 |
| 6,073,159 A | 6/2000 | Emer et al. .................. 718/103 |
| 6,073,215 A | 6/2000 | Snyder ........................ 711/137 |
| 6,079,008 A | 6/2000 | Clery, III ..................... 712/11 |
| 6,085,215 A | 7/2000 | Ramakrishnan et al. .... 718/102 |
| 6,085,294 A | 7/2000 | Van Doren et al. ......... 711/144 |
| 6,092,127 A | 7/2000 | Tausheck ...................... 710/56 |
| 6,092,158 A | 7/2000 | Harriman et al. ........... 711/151 |
| 6,112,016 A | 8/2000 | MacWilliams et al. ..... 710/107 |
| 6,134,665 A | 10/2000 | Klein et al. ................. 713/300 |
| 6,141,689 A | 10/2000 | Yasrebi ....................... 709/228 |
| 6,141,765 A | 10/2000 | Sherman ..................... 713/400 |
| 6,144,669 A | 11/2000 | Williams et al. ............ 370/401 |
| 6,145,054 A | 11/2000 | Mehrotra et al. ............ 711/119 |
| 6,157,955 A | 12/2000 | Narad et al. ................. 709/228 |
| 6,160,562 A | 12/2000 | Chin et al. ................... 345/520 |
| 6,182,177 B1 | 1/2001 | Harriman .................... 710/112 |
| 6,195,676 B1 | 2/2001 | Spix et al. ................... 718/107 |
| 6,199,133 B1 | 3/2001 | Schnell ....................... 710/110 |
| 6,201,807 B1 | 3/2001 | Prasanna .................... 370/389 |
| 6,212,542 B1 | 4/2001 | Kahle et al. ................. 718/102 |
| 6,212,611 B1 | 4/2001 | Nizar et al. .................. 711/169 |
| 6,216,220 B1 | 4/2001 | Hwang ....................... 712/219 |
| 6,223,207 B1 | 4/2001 | Lucovsky et al. ........... 718/107 |
| 6,223,238 B1 | 4/2001 | Meyer et al. ................ 710/312 |
| 6,223,279 B1 | 4/2001 | Nishimura et al. .......... 712/228 |
| 6,247,025 B1 | 6/2001 | Bacon ......................... 707/206 |
| 6,256,713 B1 | 7/2001 | Audityan et al. ............ 711/141 |
| 6,272,616 B1 | 8/2001 | Fernando et al. ............. 712/20 |
| 6,275,505 B1 | 8/2001 | O'Loughlin et al. ........ 370/473 |
| 6,279,113 B1 | 8/2001 | Vaidya ........................ 713/201 |
| 6,289,011 B1 | 9/2001 | Seo et al. .................... 370/388 |
| 6,298,370 B1 | 10/2001 | Tang et al. .................. 718/102 |
| 6,307,789 B1 | 10/2001 | Wolrich et al. ......... 365/189.01 |
| 6,324,624 B1 | 11/2001 | Wolrich et al. .............. 711/152 |
| 6,345,334 B1 | 2/2002 | Nakagawa et al. .......... 711/104 |
| 6,347,344 B1 | 2/2002 | Baker et al. ................... 710/20 |
| 6,356,962 B1 | 3/2002 | Kasper ......................... 710/29 |
| 6,360,262 B1 | 3/2002 | Guenthner et al. .......... 709/226 |
| 6,373,848 B1 | 4/2002 | Allison et al. ............... 370/401 |
| 6,389,449 B1 | 5/2002 | Nermirovsky et al. ...... 709/108 |
| 6,393,483 B1 | 5/2002 | Latif et al. ................... 709/226 |
| 6,415,338 B1 | 7/2002 | Habot .......................... 710/22 |
| 6,426,940 B1 | 7/2002 | Seo et al. .................... 370/216 |

| | | | |
|---|---|---|---|
| 6,427,196 B1 | 7/2002 | Adiletta et al. | 711/158 |
| 6,430,626 B1 | 8/2002 | Witkowski et al. | 709/249 |
| 6,434,145 B1 | 8/2002 | Opsasnick et al. | 370/394 |
| 6,463,072 B1 | 10/2002 | Wolrich et al. | 370/439 |
| 6,532,509 B1 | 3/2003 | Wolrich et al. | 710/240 |
| 6,552,826 B2 | 4/2003 | Adler et al. | 358/442 |
| 6,560,667 B1 | 5/2003 | Wolrich et al. | 710/310 |
| 6,577,542 B2 | 6/2003 | Wolrich et al. | 365/189.01 |
| 6,584,522 B1 | 6/2003 | Wolrich et al. | 710/100 |
| 6,587,906 B2 | 7/2003 | Wolrich et al. | 710/240 |
| 6,606,704 B1 | 8/2003 | Adiletta et al. | 712/248 |
| 6,625,654 B1 | 9/2003 | Wolrich et al. | 709/230 |
| 6,631,430 B1 | 10/2003 | Wolrich et al. | 710/100 |
| 6,631,462 B1 | 10/2003 | Wolrich et al. | 712/225 |
| 6,661,794 B1 | 12/2003 | Wolrich et al. | 370/394 |
| 6,667,920 B2 | 12/2003 | Wolrich et al. | 365/201 |
| 6,668,317 B1 | 12/2003 | Bernstein et al. | 712/245 |
| 6,681,300 B2 | 1/2004 | Wolrich et al. | 711/152 |
| 6,694,380 B1 | 2/2004 | Wolrich et al. | 710/5 |
| 6,718,457 B2 * | 4/2004 | Tremblay et al. | 712/212 |
| 2002/0116587 A1 * | 8/2002 | Modelski et al. | 711/154 |
| 2003/0067913 A1 * | 4/2003 | Georgiou et al. | 370/389 |

OTHER PUBLICATIONS

U.S. Appl. No. 10/643,438, filed Aug. 19, 2003, Bernstein et al.

U.S. Appl. No. 10/615,500, filed Jul. 8, 2003, Adiletta.

U.S. Appl. No. 10/615,280, filed Jul. 8, 2003, Wolrich et al.

U.S. Appl. No. 10/208,264, filed Jul. 30, 2002, Adiletta et al.

U.S. Appl. No. 10/057,723, filed Jan. 25, 2002, Wolrich et al.

Byrd et al., "Multithread Processor Architectures," *IEEE Spectrum*, vol. 32, No. 8, New York, Aug. 1, 1995, pp. 38–46.

Doyle et al., *Microsoft Press Computer Dictionary*, 2nd ed., Microsoft Press, Redmond, Washington, USA, 1994, p. 326.

Fillo et al., "The M-Machine Multicomputer," IEEE Proceedings of MICRO-28, 1995, pp. 146–156.

Gomez et al., "Efficient Multithreaded User–Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103–117.

Haug et al., "Reconfigurable hardware as shared resource for parallel threads," IEEE Symposium on FPGAs for Custom Computing Machines, 1998, 2 pages.

Hauser et al., "Garp: a MIPS processor with a reconfigurable coprocessor," Proceedings of the 5th Annual IEEE Symposium on Field–Programmable Custom Computing Machines, 1997, p. 12–21.

Hyde, R., "Overview of Memory Management," *Byte*, vol. 13, No. 4, 1998, pp. 219–225.

Litch et al., "StrongARMing Portable Communications," IEEE Micro, 1998, pp. 48–55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35–41.

Tremblay et al., "A Three Dimensional Register File for Superscaler Processors," IEEE Proceedings of the 28th Annual Hawaii International Conference on System Sciences, 1995, pp. 191–201.

Trimberger et al, "A time–multiplexed FPGA," Proceedings of the 5th Annual IEEE Symposium on Field–Programmable Custom Computing Machines,1998, pp. 22–28.

Turner et al., "Design of a High Performance Active Router," Internet Document, *Online*, Mar. 18, 1999, 20 pages.

Vibhatavanijt et al., "Simultaneous Multithreading–Based Routers," Proceedings of the 2000 International Conference of Parallel Processing, Toronto, Ontario, Canada, Aug. 21–24, 2000, pp. 362–359.

Wazlowski et al., "PRSIM–II computer and architecture," IEEE Proceedings, Workshop on FPGAs for Custom Computing Machines, 1993, 8 pages.

U.S. Appl. No. 09/473,571, filed Dec. 28, 1999, Wolrich et al.

U.S. Appl. No. 09/475,614, filed Dec. 30, 1999, Wolrich et al.

Moors, et al., "Cascading Content–Addressable Memories", *IEEE Micro*, 12(3):56–66 (1992).

Shah, Niraj, "Understanding Network Processors", *Masters Thesis Submitted to the University of California, Berkeley*, Sep. 4, 2001.

International Search Report from PCT/US03/01578; mailed Feb. 19, 2004.

International Search Report from PCT/US03/01580; mailed Apr. 21, 2004.

* cited by examiner

PARALLEL PROCESSOR WITH FUNCTIONAL PIPELINE PROVIDING PROGRAMMING ENGINES BY SUPPORTING MULTIPLE CONTEXTS AND CRITICAL SECTION

BACKGROUND

This invention relates to functional pipelines.

Parallel processing is an efficient form of information processing of concurrent events of a computing system. Parallel processing demands concurrent execution of many programs, in contrast to sequential processing. In the context of parallel processing, parallelism involves doing more than one thing at the same time. Unlike a serial paradigm where all tasks are performed sequentially at a single station or a pipelined machine where tasks are performed at specialized stations, with parallel processing, many stations are provided, each capable of performing and carrying out various tasks and functions simultaneously. A number of stations work simultaneously and independently on the same or common elements of a computing task. Accordingly, parallel processing solves various types of computing tasks and certain problems are suitable for solution by applying several instruction processing units and several data streams.

DESCRIPTION

Figure 1:
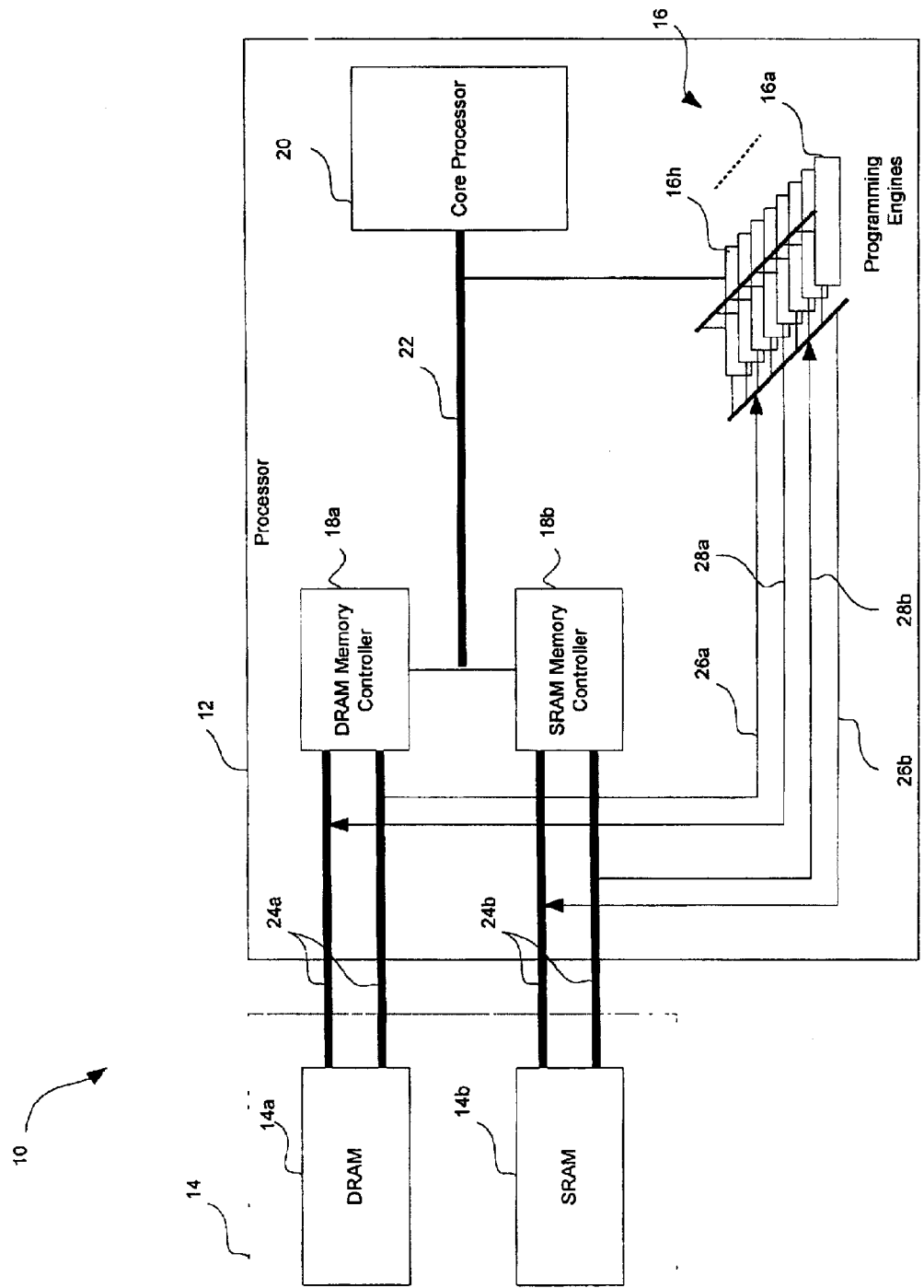
FIG. 1 is a block diagram of a processing system.

Architecture:

Referring to FIG. 1, a computer processing system 10 includes a parallel, hardware-based multithreaded network processor 12. The hardware-based multithreaded processor 12 is coupled to a memory system or memory resource 14. Memory system 14 includes dynamic random access memory (DRAM) 14a and static random access memory 14b (SRAM). The processing system 10 is especially useful for tasks that can be broken into parallel subtasks or functions. Specifically, the hardware-based multithreaded processor 12 is useful for tasks that are bandwidth oriented rather than latency oriented. The hardware-based multithreaded processor 12 has multiple functional microengines or programming engines 16 each with multiple hardware controlled threads that are simultaneously active and independently work on a specific task.

The programming engines 16 each maintain program counters in hardware and states associated with the program counters. Effectively, corresponding sets of context or threads can be simultaneously active on each of the programming engines 16 while only one is actually operating at any one time.

In this example, eight programming engines 16a–16h are illustrated in FIG. 1. Each engine from the programming engines 16a–16h processes eight hardware threads or contexts. The eight programming engines 16a–16h operate with shared resources including memory resource 14 and bus interfaces (not shown). The hardware-based multithreaded processor 12 includes a dynamic random access memory (DRAM) controller 18a and a static random access memory (SRAM) controller 18b. The DRAM memory 14a and DRAM controller 18a are typically used for processing large volumes of data, e.g., processing of network payloads from network packets. The SRAM memory 14b and SRAM controller 18b are used in a networking implementation for low latency, fast access tasks, e.g., accessing look-up tables, memory for the core processor 20, and the like.

The eight programming engines 16a–16h access either the DRAM memory 14a or SRAM memory 14b based on characteristics of the data. Thus, low latency, low bandwidth data is stored in and fetched from SRAM memory 14b, whereas higher bandwidth data for which latency is not as important, is stored in and fetched from DRAM memory 14a. The programming engines 16a–16h can execute memory reference instructions to either the DRAM controller 18a or SRAM controller 18b.

The hardware-based multithreaded processor 12 also includes a processor core 20 for loading microcode control for the programming engines 16a–16h. In this example, the processor core 20 is an XScale™ based architecture.

The processor core 20 performs general purpose computer type functions such as handling protocols, exceptions, and extra support for packet processing where the programming engines 16 pass the packets off for more detailed processing such as in boundary conditions.

The processor core 20 has an operating system (not shown). Through the operating system (OS), the processor core 20 can call functions to operate on the programming engines 16a–16h. The processor core 20 can use any supported OS, in particular, a real time OS. For the core processor 20 implemented as an XScale™ architecture, operating systems such as Microsoft NT real-time, VXWorks and µCOS, or a freeware OS available over the Internet can be used.

Advantages of hardware multithreading can be explained by SRAM or DRAM memory accesses. As an example, an SRAM access requested by a context (e.g., Thread_0), from one of the programming engines 16 will cause the SRAM controller 18b to initiate an access to the SRAM memory 14b. The SRAM controller 18b accesses the SRAM memory 14b, fetches the data from the SRAM memory 14b, and returns data to a requesting programming engine 16.

During an SRAM access, if one of the programming engines 16a–16h had only a single thread that could operate, that programming engine would be dormant until data was returned from the SRAM memory 14b.

By employing hardware context swapping within each of the programming engines 16a–16h, the hardware context swapping enables other contexts with unique program counters to execute in that same programming engine. Thus, another thread e.g., Thread_1 can function while the first thread, Thread_0, is awaiting the read data to return. During execution, Thread_1 may access the DRAM memory 14a. While Thread_1 operates on the DRAM unit, and Thread_0 is operating on the SRAM unit, a new thread, e.g., Thread_2 can now operate in the programming engine 16. Thread_2 can operate for a certain amount of time until it needs to access memory or perform some other long latency operation, such as making an access to a bus interface. Therefore, simultaneously, the multi-threaded processor 12 can have a bus operation, an SRAM operation, and a DRAM operation all being completed or operated upon by one of the programming engines 16 and have one more threads or contexts available to process more work.

The hardware context swapping also synchronizes the completion of tasks. For example, two threads can access the shared memory resource, e.g., the SRAM memory 14b. Each one of the separate functional units, e.g., the SRAM controller 18b, and the DRAM controller 18a, when they complete a requested task from one of the programming engine threads or contexts reports back a flag signaling completion of an operation. When the programming engines 16a–16h receive the flag, the programming engines 16a–16h can determine which thread to turn on.

One example of an application for the hardware-based multithreaded processor 12 is as a network processor. As a network processor, the hardware-based multithreaded processor 12 interfaces to network devices such as a Media Access Controller (MAC) device, e.g., a 10/100BaseT Octal MAC 13a or a Gigabit Ethernet device 13b. In general, as a network processor, the hardware-based multithreaded processor 12 can interface to any type of communication device or interface that receives or sends large amount of data. The computer processing system 10 functioning in a networking application can receive network packets and process those packets in a parallel manner.

Figure 2:
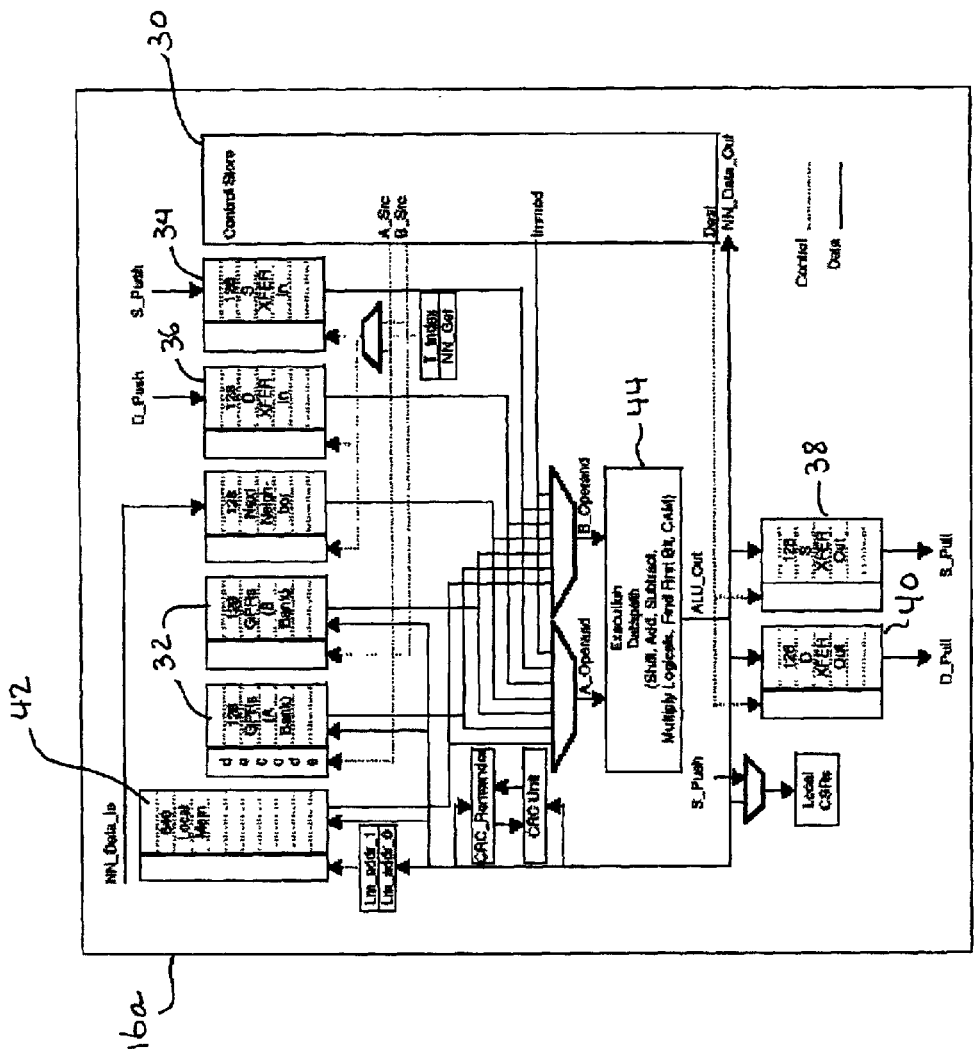
FIG. 2 is a detailed block diagram of the processing system of FIG. 1.

Programming Engine Contexts:

Referring to FIG. 2, one exemplary programming engine 16a from the programming engines 16a–16h, is shown. The programming engine 16a includes a control store 30, which in one example includes a RAM of 4096 instructions, each of which is 40-bits wide. The RAM stores a microprogram that the programming engine 16a executes. The microprogram in the control store 30 is loadable by the processor core 20 (FIG. 1).

In addition to event signals that are local to an executing thread, the programming engine 16a employs signaling states that are global. With signaling states, an executing thread can broadcast a signal state to all programming engines 16a–16h. Any and all threads in the programming engines can branch on these signaling states. These signaling states can be used to determine availability of a resource or whether a resource is due for servicing. The context event logic has arbitration for the eight (8) threads. In one example, the arbitration is a round robin mechanism. Other techniques could be used including priority queuing or weighted fair queuing.

As described above, the programming engine 16a supports multi-threaded execution of eight contexts. This allows one thread to start executing just after another thread issues a memory reference and must wait until that reference completes before doing more work. Multi-threaded execution is critical to maintaining efficient hardware execution of the programming engine 16a because memory latency is significant. Multi-threaded execution allows the programming engines 16 to hide memory latency by performing useful independent work across several threads.

The programming engine 16a, to allow for efficient context swapping, has its own register set, program counter, and context specific local registers. Having a copy per context eliminates the need to move context specific information to and from shared memory and programming engine registers for each context swap. Fast context swapping allows a context to do computation while other contexts wait for input-output (I/O), typically, external memory accesses to complete or for a signal from another context or hardware unit.

For example, the programming engine 16a executes the eight contexts by maintaining eight program counters and eight context relative sets of registers. There can be six different types of context relative registers, namely, general purpose registers (GPRs) 32, inter-programming agent registers (not shown), Static Random Access Memory (SRAM) input transfer registers 34, Dynamic Random Access Memory (DRAM) input transfer registers 36, SRAM output transfer registers 38, DRAM output transfer registers 40.

The GPRs 32 are used for general programming purposes. The GPRs 32 are read and written exclusively under program control. The GPRs 32, when used as a source in an instruction, supply operands to an execution datapath 44. When used as a destination in an instruction, the GPRs 32 are written with the result of the execution datapath 44. The programming engine 16a also includes I/O transfer registers 34, 36, 38 and 40 which are used for transferring data to and from the programming engine 16a and locations external to the programming engines 16a, e.g., the DRAM memory 14a, the SRAM memory 14b, and etc.

A local memory 42 is also used. The local memory 42 is addressable storage located in the programming engine 16a. The local memory 42 is read and written exclusively under program control. The local memory 42 also includes variables shared by all the programming engines 16a–16h. Shared variables are modified in various assigned tasks during functional pipeline stages by the programming engines 16a–16h, which are described next. The shared variables include a critical section, defining the read-modify-write times. The implementation and use of the critical section in the computing processing system 10 is also described below.

Figure 3:
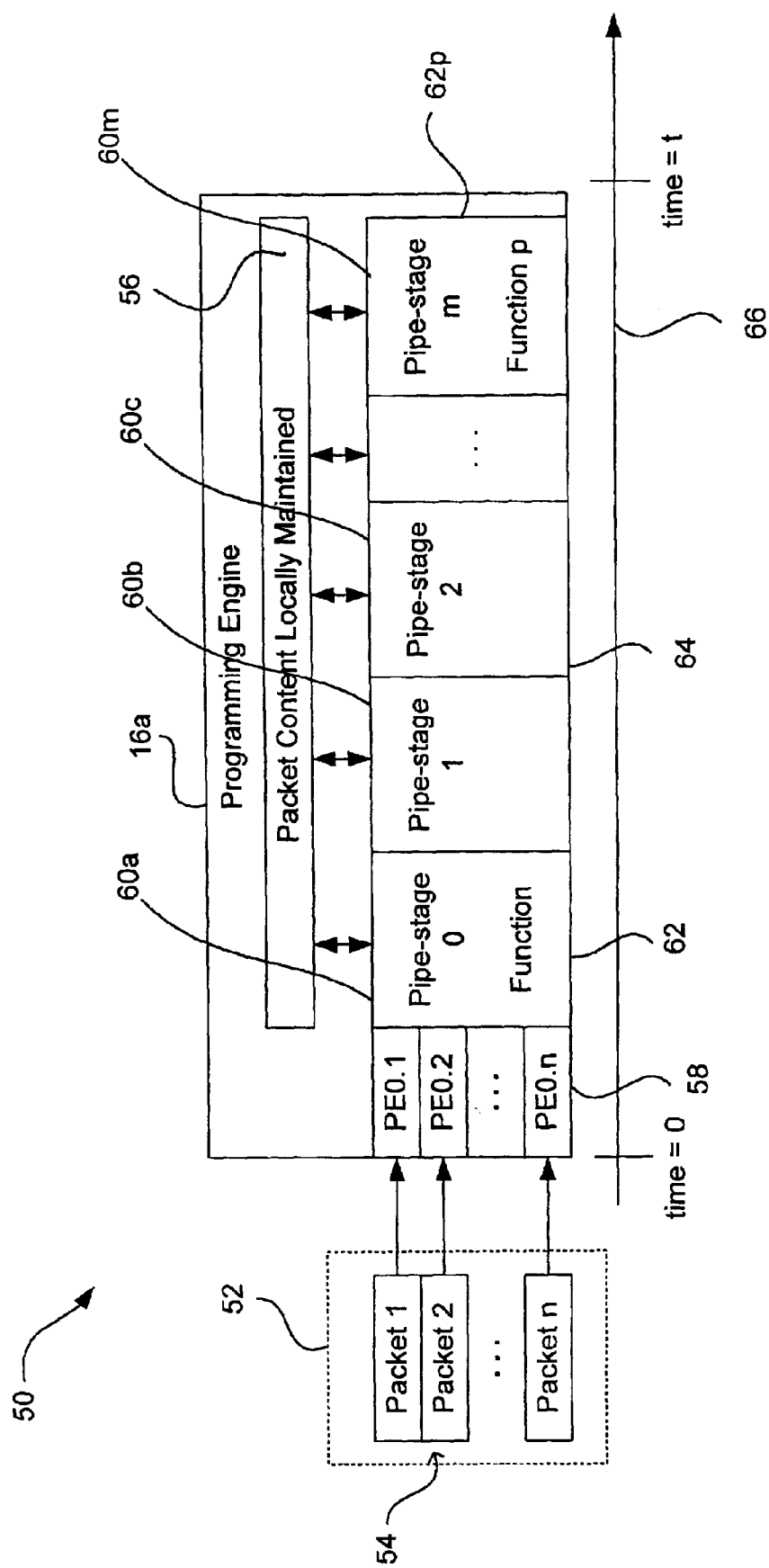
FIG. 3 is a block diagram of a programming engine of the processing system of FIG. 1.

Functional Pipelining and Pipeline Stages:

Referring to FIG. 3, the programming engine 16a is shown in a functional pipeline unit 50. The functional pipeline unit 50 includes the programming engine 16a and a data unit 52 that includes data, operated on by the programming engine, e.g., network packets 54. The programming engine 16a is shown having a local register unit 56. The local register unit 56 stores information from the data packets 54. This information can be for example, a payload from a network packet, or data from other sources.

In the functional pipeline unit 50, the contexts 58 of the programming engines 16a, namely, Programming Engine0.1 (PE0.1) through Programming Engine0.n (PE0.n), remain with the programming engine 16a while different functions are performed on the data packets 54 as time 66 progresses from time=0 to time=t. A programming execution time is divided into "m" functional pipeline stages or pipe-stages 60a–60m. Each pipeline stage of the pipeline stages 60a–60m performs different pipeline functions 62a, 64, or 62p on data in the pipeline.

The pipeline stage 60a is, for example, a regular time interval within which a particular processing function, e.g., the function 62 is applied to one of the data packets 54. A processing function 62 can last one or more pipelines stages 62.

The function 64, for example, lasts two pipeline stages, namely pipeline stages 60b and 60c.

A single programming engine such as the programming engine 16a can constitute a functional pipeline unit 50. In the functional pipeline unit 50, the functions 62a, 64, and 62p move through the functional pipeline unit 50 from one programming engine 16 to another programming engine 16, as will be described next.

Figure 4:
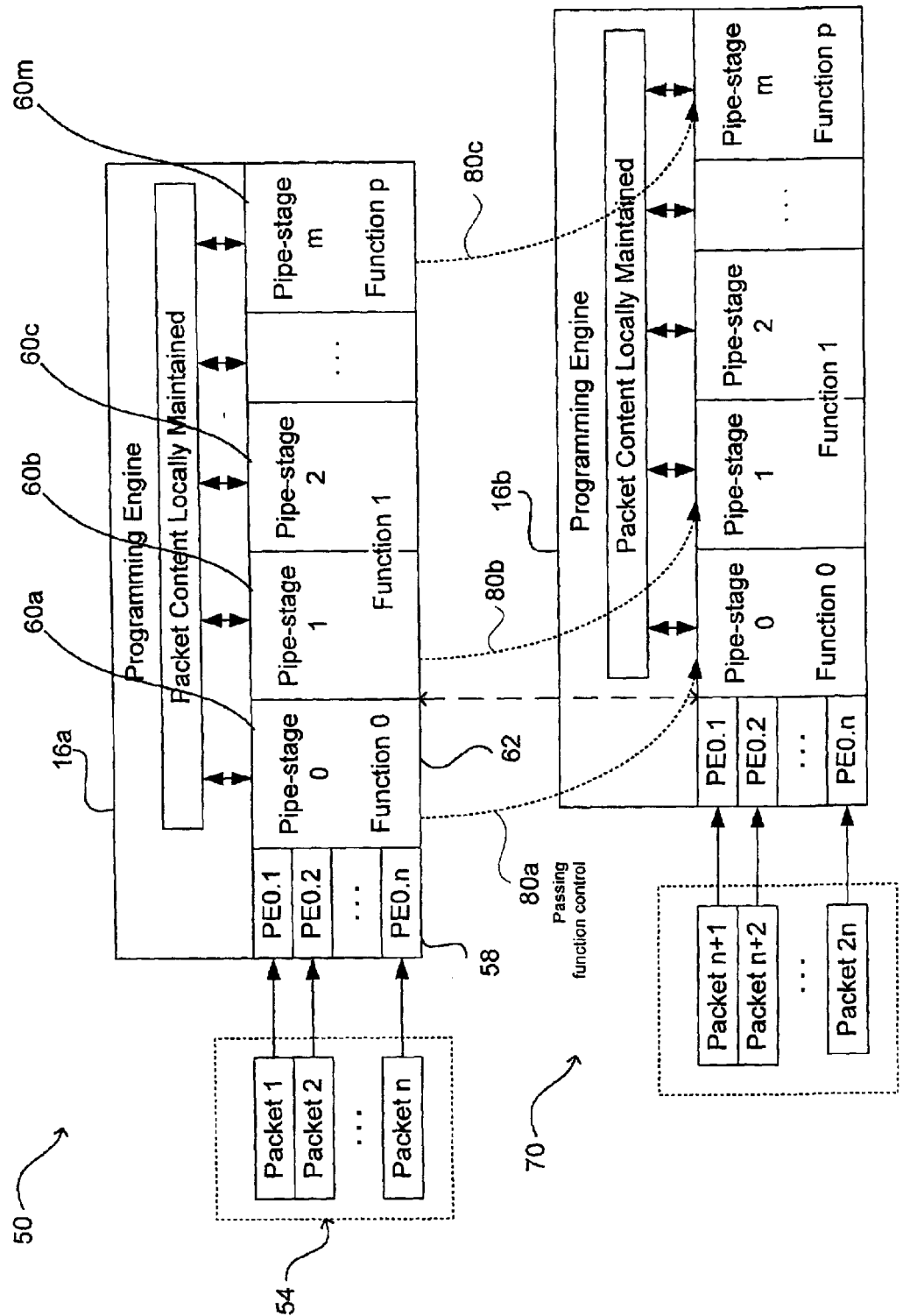
FIG. 4 is a block diagram of a functional pipeline unit of the processing system of FIG. 1.

Referring to FIG. 4, the data packets 54 are assigned to programming engine contexts 58 in order. Thus, if "n" threads or contexts 58 execute in the programming engine 16a, the first context 58, "PE0.1" completes processing of the data packet 54 before the data packets 54 from the "PE0.n" context arrives. With this approach the programming engine 16b can begin processing the "n+1" packet.

Dividing the execution time of the programming engines 16 into functional pipeline stages 60a–60c results in more than one programming engine 16 executing an equivalent functional pipeline unit 70 in parallel. The functional pipeline stage 60a is distributed across two programming engines 16a and 16b, with each of the programming engines 16a and 16b executing eight contexts each.

In operation, each of the data packets 54 remains with one of the contexts 58 for a longer period of time as more programming engines 16 are added to the functional pipeline units 50 and 70. In this example, the data packet 54 remains with a context sixteen data packet arrival times (8 contexts×2 programming engines) because context PE0.1 is not required to accept another data packet 58 until the other contexts 58 have received their data packets.

In this example, the function 62 of the functional pipeline stage 60a can be passed from the programming engine 16a to the programming engine 16b. Passing of the function 62 is accomplished by passing the processing functions from one programming engine to another, as illustrated by dotted lines 80a–80c in FIG. 4.

The number of functional pipeline stages 60a–60m is equal to the number of the programming engines 16a and 16b in the functional pipeline units 50 and 70. This ensures that a particular pipeline stage executes in only one programming engine 16 at any one time.

Figure 5:
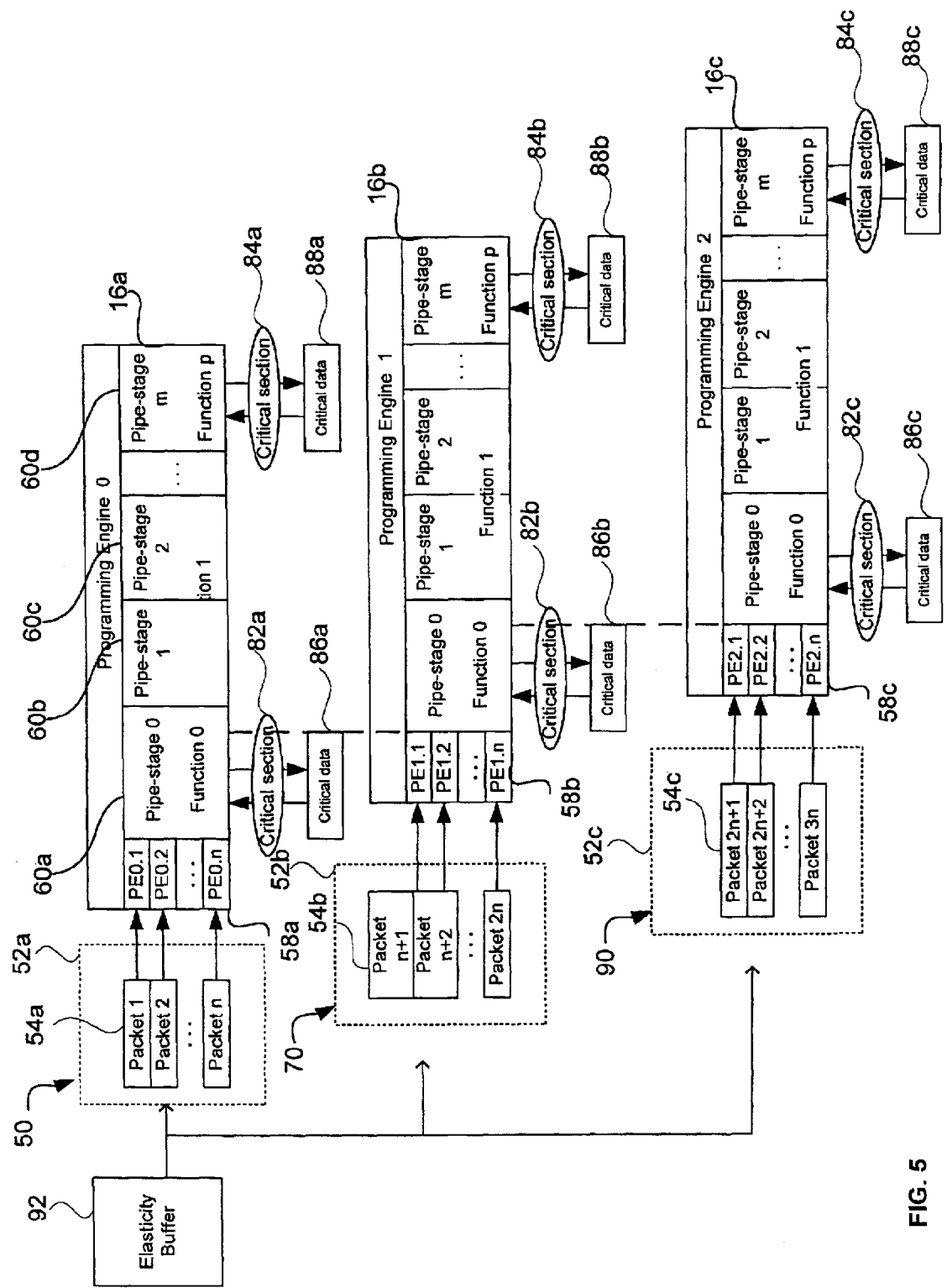
FIG. 5 is a block diagram illustrating details of the processing system of FIG. 1.

Referring to FIG. 5, functional pipeline units 50, 70, and 90 are shown to include the programming engines 16a (PE0), 16b (PE1), and 16c (PE2), respectively, in addition to the data units 52a–52c. Between the programming engines 16a–16c, critical sections 82a–82c and 84a–84c are provided. The critical sections 82a–82c and 84a–84c are used in conjunction with shared data 86a–86c and 88a–88c.

In the critical sections 82a–82c and 84a–84c, the programming engine contexts 58a–58c are given exclusive access to the shared data 86a–86c (e.g., cyclic redundancy check residue (CRC), reassembly context, or a statistic) in external memory.

In operation, functions can be distributed across one or more functional pipeline stages 60a–60d. For example, the critical section 82a represents a section of code where only one programming engine context, in this case, the context 58a of the programming engine 16a, has exclusive modification privileges for a global resource (i.e., shared data 86a), such as a location in memory, at any one time. Thus, the critical section 82a provides exclusive modification privileges to a particular functional pipeline stage of the programming engine 16a. The critical section 82a also provides support for exclusive access between the contexts 58a–58c in the programming engines 16a–16c.

In certain implementations only one function modifies the shared data 86a–86c between the programming engines 16a–16c, to ensure exclusive modification privileges between the programming engines 16a–16c. The function that modifies the shared data 86a–86c executes, e.g., in a single functional pipeline stage 60a, and the functional pipeline unit 50 is designed so that only one programming engine from all the programming engines 16a–16c executes the functional pipeline stage 60a at any one time.

Still referring to FIG. 5, each of the programming engines 16a–16c is assigned exclusive modification privileges to the non-shared data 86a–86c and 88a–88c, satisfying the requirement that only one function modifies the non-shared data 86a–86c and 88a–88c between the programming engines 16a–16c.

In this example, by optimizing the control flow through the functional pipeline units 50, 70, and 90, the architectural solution described above presents greater network processing power to the hardware-based multithreaded network processor 12.

In the functional pipeline unit 50, the programming engine 16a transitions into the critical section 82a of the functional pipeline stage 60a unless it can be assured that its "next" programming engine 16b has transitioned out of the critical section 82a. The programming engine 16b uses inter-thread signaling where the signaling states can be used to determine availability of a memory resource or whether a memory resource is due for servicing. There are four ways to signal a next context using inter-thread signaling:

| Thread Signaling | Mechanism |
| --- | --- |
| 1. Signal next thread in the same PE | Local Control and Status Registers (CSR) write |
| 2. Signal a specific thread in the same PE | Local CSR write |
| 3. Signal the thread in the next PE | Local CSR write |
| 4. Signal any thread in an PE | CSR write |

Critical sections such as CRC calculations are performed in the order of incoming data packets 54a–54c because inter-thread signaling is performed in order.

When the functional pipeline stage 60a transition occurs between the programming engines 16a and 16b, the elasticity buffer 92, implemented as a ring, is used. Each functional pipeline stage 60a is implemented to execute within the time allocated to the functional pipeline stage 60a. However, the elasticity buffer 92 accommodates jitter in the execution of the functional pipeline unit 50. Thus, if a functional pipeline stage 60a falls behind in execution due to system anomalies such as high utilization of memory units over a short period of time, the elasticity buffer 92 allows the context 58a of the functional pipeline stage 60a to be buffered so that the previous functional pipeline stages will not be stalled waiting for the next pipeline stage to complete. The elasticity buffer 92 as shown in FIG. 5 also allows different heartbeats to the different functional pipelines units 70 and 90.

By using the functional pipeline stages, as described above, the functional pipeline units 50, 70, and 90 cover memory latency and provides sufficient computation cycles for data packets 54 arriving faster than a single stream computation stage. By providing a mechanism for fast synchronization from one programming engine to the next programming engine which performs the same set of functions on a new set of data packets 54, parallel processing capability of the programming engines are greatly enhanced. Multiple means for passing functional state and control is thus provided.

Other Embodiments:

In the example described above in conjunction with FIGS. 1–5, the computer processing system 10 may implement programming engines 16 using a family of network processors, namely, Intel Network Processor Family chips designed by Intel® Corporation, of Santa Clara, Calif.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system comprising:
a parallel processor that assigns system functions for processing data, the parallel processor comprising:
a plurality of programming engines that support multiple contexts, the plurality of programming engines arranged to provide a functional pipeline;
a functional pipeline control unit that assigns system functions to and passes functional data among the plurality of programming engines; and
a critical section that provides exclusive privileges to one of the multiple contexts for modifying a shared resource.

2. The system of claim 1 further comprising:
a synchronization unit across the functional pipeline unit for synchronizing tasks performed by the programming engines.

3. The system of claim 1 wherein the functional pipeline unit includes a plurality of functional pipeline stages.

4. The system of claim 3 wherein the plurality of programming engines have an execution time for processing a task and the execution time is partitioned into a number of time intervals corresponding to the number of the plurality of functional pipeline stages.

5. The system of claim 4 wherein each of the plurality of functional pipeline stages performs a different system function.

6. The system of claim 1 wherein at least one of the plurality of programming engines is the functional pipeline unit.

7. The system of claim 1 wherein the plurality of programming engines are configured to process a data packet in order.

8. The system of claim 7 wherein the data packet are assigned to the multiple contexts of the plurality of programming engines.

9. The system of claim 1 wherein the plurality of prograrmning engines are configured to execute a data packet processing function using the functional pipeline unit of the system.

10. The system of claim 9 wherein a data packet is maintained in the plurality of programming engines for a period of time corresponding to the number of the plurality of programming engines.

11. The system of claim 3 wherein the number of the plurality of pipeline stages is equal to the number of the plurality of progranImrng engines.

12. The system of claim 3 wherein the plurality of pipeline stages include the critical section.

13. The system of claim 12 wherein the critical section provides exclusive access for the multiple contexts to non-shared data required for processing data packets.

14. The system of claim 3 wherein the plurality of programming engines include inter-thread signaling.

15. The system of claim 3 wherein the plurality of programming engines include an elasticity buffer that accommodates jitter between the plurality of pipeline stages upon execution of a data packet processing function.

16. A method of transferring data between a plurality of programming engines, the method comprising:
assigning system functions for processing data to corresponding ones of a plurality of programming engines that provide a functional pipeline unit in a parallel processor and, which supports execution of multiple contexts in each of the plurality of programming engines;
passing functional data among the plurality of programming engines in the functional pipeline unit; and providing exclusive privileges to one of the multiple contexts for modifying a shared resource.

17. The method of claim 16 further comprising:
synchronizing the system functions from a first programming engine of the functional pipeline unit to a second programming engine of the functional pipeline unit.

18. The method of claim 17 further comprising:
partitioning an execution time into a number of time intervals corresponding to the number of plurality of pipeline stages.

19. The method of claim 16 wherein the plurality of programming engines use multiple contexts to process the data packet in order.

20. The method of claim 16 wherein the plurality of programming engines execute a data packet processing functions using the functional pipeline unit of the system.

21. The method of claim 16 further comprising:
using a critical section that provides exclusive access for the multiple contexts to non-shared data required for processing data packets.

22. The method of claim 16 further comprising:
employing an elasticity buffer to accommodate jitter between the plurality of pipeline stages upon execution of a data packet processing function.

23. A computer program product residing on a computer readable medium for causing a parallel processor to perform a function comprises instructions causing the processor to:
assign system functions for processing data in a parallel processor to corresponding ones of a plurality of programming engines that provide a functional pipeline unit, which supports execution of multiple contexts in each of the plurality of programming engines;
pass functional data among the plurality of progranuning engines in the functional pipeline unit; and
provide exclusive privileaes to one of the multiple contexts for modifying a shared resource.

24. The computer program product of claim 23 further comprising instructions causing the processor to synchronize the system functions from a first programming engine of the functional pipeline unit to a second programming engine of the functional pipeline unit.

25. The computer program product of claim 23 wherein the plurality of programming engines execute a data packet processing functions using the functional pipeline unit of the system.

* * * * *